United States Patent [19]

Kazama

[11] Patent Number: 5,083,118
[45] Date of Patent: Jan. 21, 1992

[54] TRANSPARENT COORDINATE INPUT APPARATUS FOR ELECTROSTATIC CAPACITY COUPLING SYSTEM

[75] Inventor: Mitsuo Kazama, Soka, Japan
[73] Assignee: Pentel Kabushiki Kaisha, Japan
[21] Appl. No.: 510,286
[22] Filed: Apr. 16, 1990
[51] Int. Cl.$^5$ .............................................. G09G 3/02
[52] U.S. Cl. ........................................ 340/706; 178/18
[58] Field of Search .............. 340/706, 707, 708, 712; 178/18, 19, 20; 313/479

[56] References Cited

U.S. PATENT DOCUMENTS

| | | | |
|---|---|---|---|
| 3,974,332 | 8/1976 | Abe et al. ................................ | 178/18 |
| 4,477,877 | 10/1984 | Nakamura et al. .................... | 178/19 |
| 4,492,819 | 1/1985 | Rodgers et al. ....................... | 178/18 |
| 4,571,454 | 2/1986 | Tamaru et al. ....................... | 178/18 |
| 4,947,156 | 8/1990 | Sato et al. ............................. | 340/707 |

Primary Examiner—Jeffery A. Brier
Assistant Examiner—Regina Liang
Attorney, Agent, or Firm—Bruce L. Adams; Van C. Wilks

[57] ABSTRACT

A transparent coordinate input apparatus for an electrostatic capacity coupling system mounted on a CRT tube surface, an LCD display surface or the like to effect input. The transparent coordinate input apparatus comprises a tablet composed of a plurality of electrode wires arranged close to the display surface of the inptu device such as CRT, LCD, etc. and arranged in an axial direction of the axis of coordinate; a control section for sequentially applying pulse signals to the electrode wires of said tablet; a coordinate indication means electrostatic-capacity coupled to the pulse applied to each of the electrode wires of said tablet to effect signal detection; a calculation section for calculating a positional coordinate from the signal detected by said coordinate indication means, and a noise preventive means for relieving a noise from the display surface of the input device such as CRT, LCD, etc., said noise preventive means having one end of each of the electrode wires of said tablet terminated at a resistor having hundreds of ohms, a pattern of each of the electrode wires of a layer close to the tube surface of CRT being increased and the gap between the electrode wires being narrowed whereby the electrode wire not applied with pulse signals functions as a shield layer.

6 Claims, 3 Drawing Sheets

TRANSPARENT COORDINATE INPUT APPARATUS FOR ELECTROSTATIC CAPACITY COUPLING SYSTEM

FIELD OF THE INVENTION

The present invention relates to a coordinate input apparatus, and more particularly to an apparatus in which a transparent coordinate input apparatus for an electrostatic capacity coupling system is mounted on a CRT tube surface, an LCD display surface or the like to effect an input.

DESCRIPTION OF THE PRIOR ART

In a conventional transparent coordinate input apparatus for an electrostatic capacity coupling system, electrode wires are arranged spaced apart in two directions perpendicular to a coordinate input board, and detection electrodes are provided on coordinate indication means such as an input pen, a cursor and the like which are in contact with the desired position on said coordinate input board to effect a coordinate input. Scanning pulses are sequentially applied to the electrode wires on the coordinate input board to amplify induction pulses induced in the detection electrodes of the coordinate indication means such as an input pen, a cursor or the like by the electrostatic induction, which pulses are subjected to digital conversion to supply to calculation means comprising a microcomputer, said calculation means calculating a contact position of the coordinate indication means on the basis of the magnitude of the induction pulse.

Apparatus mounted on the display surface of a CRT or the like to effect an input is disclosed, for example, in Japanese Patent Application Publication No. 18233/1982 published on Apr. 15, 1982. The input apparatus employs two resistance plates, and as the electrode wires for the resistance plates having a good transparency, ITO (indium tin oxide) films are used. In the present invention, the ITO film is used. but in this structure, the ITO film per se has a high resistance, which tends to induce noises from the CRT tube surface. In use, it has been necessary to provide a further shield layer, which layer is grounded to relieve an influence from the noise of the tube surface. This results in problems of higher cost, and in deteriorating the transparency.

SUMMARY OF THE INVENTION

An object of the present invention is to overcome the problem of transparency and provide a transparent coordinate input apparatus which relieves the noise of the tube surface. According to the present invention, there comprises a tablet composed of two sets of plural electrode wires arranged close to a display surface of an input device such as CRT, LCD, etc. and arranged spaced apart in a direction of an axis of coordinate. The invention also comprises a control section for sequentially applying pulse signals to each of the electrode wires of said tablet, coordinate indication means electrostatic capacity coupled to the pulse signals applied to each of the electrodes of said tablet to effect signal detection and a calculation section for calculating a positional coordinate from the pulse signals detected by said coordinate indication means. The invention further comprising a resistor of hundreds of ohms equivalently grounded to one end of each of the electrode wires of said tablet and an increased width of the electrode wire on the side of the display surface of the input device such as a CRT, LCD, etc. to narrow a gap between the electrode wires, whereby the electrode wire not applied with a pulse functions as a shield layer. The present invention has been constructed as described above, and therefore, one end of the electrode wire of the tablet was grounded with a low resistance, and a pattern of a layer close to the CRT tube surface was increased in width to narrow the gap of the pattern, whereby this layer functioned as a shield layer, enabling reduction of the noise of the tube surface. Moreover, problems in terms of cost and transparency were solved.

DESCRIPTION OF THE PREFERRED EMBODIMENTS

Figure 1:
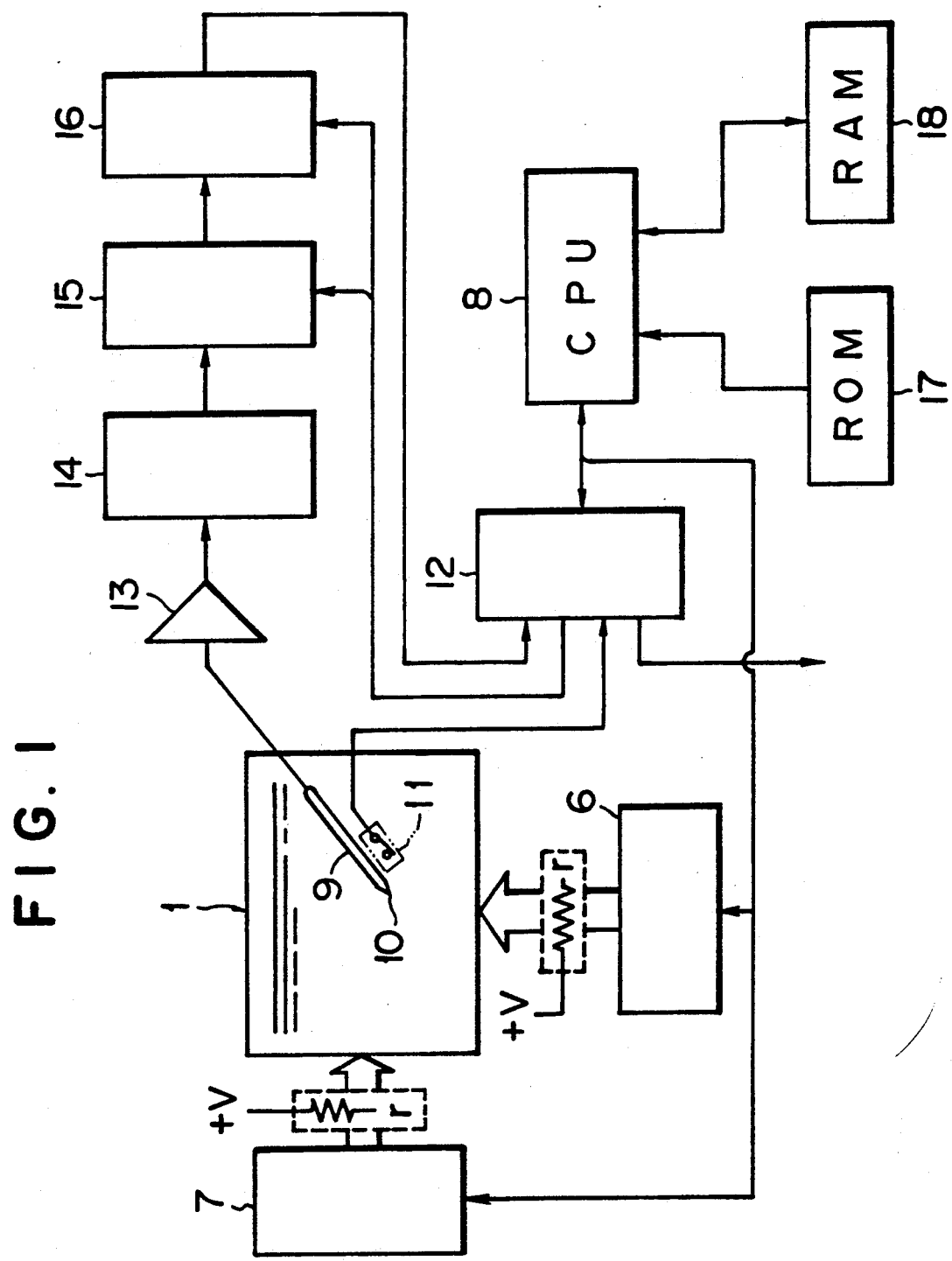
FIG. 1 is a block diagram showing an embodiment of the invention.
Figure 2:
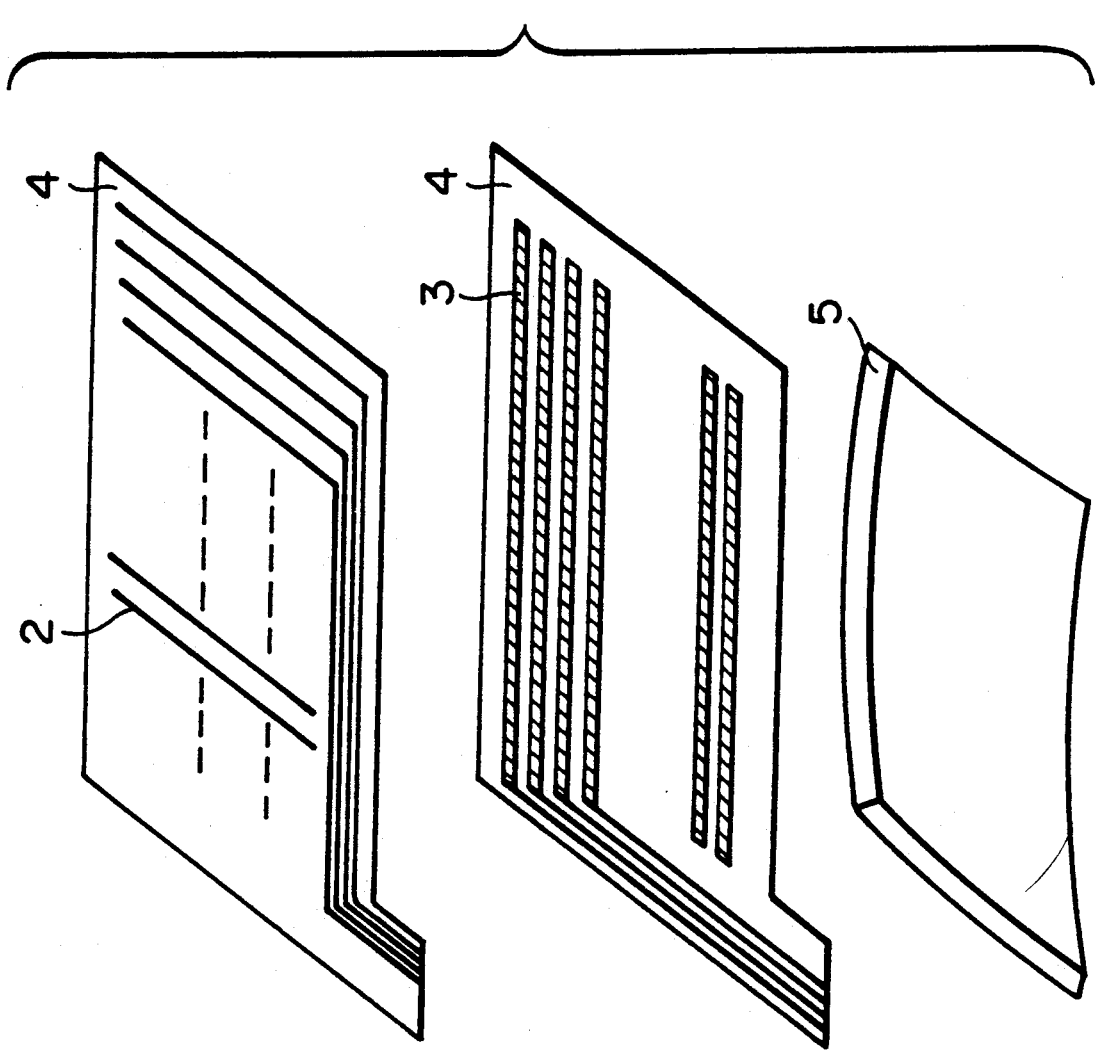
FIG. 2 is a structural view of a tablet composed of a plurality of electrode wires arranged in a direction of an axis of coordinate.
Figure 3:
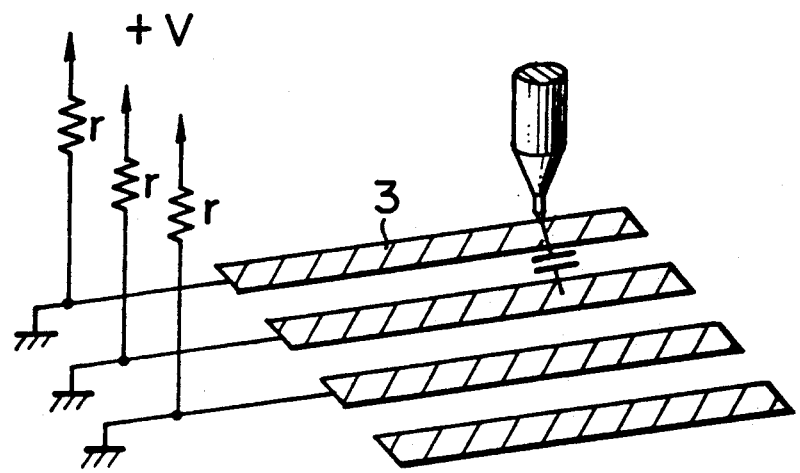
FIG. 3 is a view of an electrostatic coupling of the tablet.

One embodiment of the present invention will be described with reference to the accompanying drawings. FIG. 1 is a block diagram of a coordinate input apparatus according to the present invention. Reference numeral 1 designates a tablet; 6 an X decoder driver; 7 a Y decoder driver; 8 a CPU; 9 a detection pen; 10 the tip of the detection pen; 11 a switch; 12 an input/output port; 13 an amplifier; 14 a lowpass cutoff filter; 15 a sample hold circuit; 16 an AD converter; 17 a ROM; and 18 a RAM. Electrode wires 2 and 3 shown in exploded form in FIG. 2 are arranged perpendicularly on the tablet 1. The electrode wires Z and 3 are formed of ITO, which are subjected to vapor deposition etching as transparent electrodes on films 4, 4. With respect to the spacing arrangement of the electrode wires 2 and 3, the electrode wire 3 closer to CRT 5 is wider, as shown in FIG. 2, a gap therebetween being narrow. One end of each of the electrode wires 2 and 3 of the tablet 1 is connected to a power source +V through a low resistor r as shown in FIG. 3 and being grounded. The low resistors r, are connected to the Y and X decoder drivers 6 and 7 provided in an axial direction and controlled by the CPU 8.

Next, as the coordinate indication means for designating the desired position on the tablet 1, when the tip 10 of the detection pen 9 is placed in contact with the tablet 1, the switch 11 is turned ON to notify the input/output port 12 that the detection pen 9 is brought into contact with the tablet 1. When a contact signal of the detection pen 9 from the input/output port 12 to the tablet 1 is applied to the sample hold circuit 15 and the AD converter 16, the tip 10 of the detection pen 9 is electrostatic induction coupled to the respective electrode wires 2 and 3 at a position corresponding to the tablet 1, whereby the induced induction voltage is applied to the amplifier 13, and a signal amplified by the amplifier 13 is sequentially applied to the sample hold circuit 15 and the AD converter 16 through the lowpass cutoff filter 14 and then applied to the input/output port 12. In the input and output port 12, the position of the tablet at which the tip 10 of the detection pen 9 was contacted is detected and the signal is applied to the CPU 8. The CPU 8 utilizes the ROM 17 or RAM 18 to decide an absolute coordinate, a relative coordinate, etc. of the tablet to deliver a predetermined coordinate signal to a host computer not shown through the input/output port 12.

Figure 4:
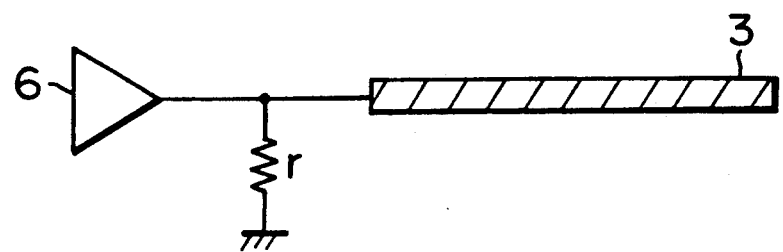
FIGS. 4 and 5 are respectively equivalent circuits of the tablet.
Figure 5:
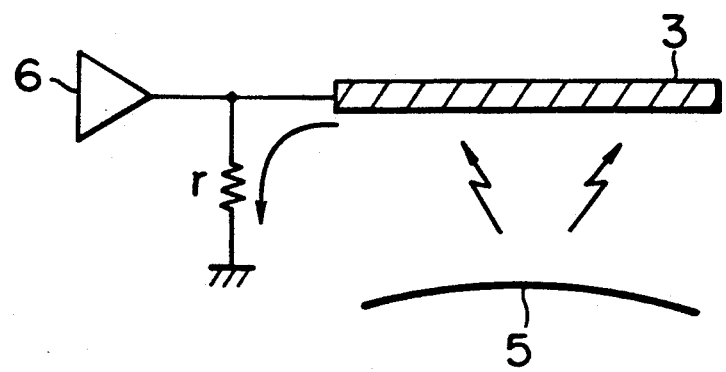

In this manner, the coordinate signal is inputted. When coming closer to the CRT tube surface, an electromagnetic wave as the noise from the CRT tube surface is applied to the tablet 1, materially lowering the detection accuracy. Thus, a portion of the low resistor r shown in FIG. 3 where no pulse is applied to the electrode wires 2 and 3 is pulled up to the electrode +V. As shown in FIG. 4, in an equivalent sense, if a power supply impedance is low, the resistor r assumes the same state as that in which it is connected to ground. The value of the resistor r relies upon an output capacity of the preceding driver section. Therefore, where no pulse is applied to the electrode wire 3 as shown in FIG. 5, the noise from the tube surface of the CRT 5 escapes to the ground through the low resistor r. Furthermore, if a pattern of the electrode wire 3 close to the tube surface of the CRT 5 is increased in width and the gap is narrowed, a sort of shield layer can be formed.

What is claimed is:

1. A transparent coordinate input apparatus mounted on a display surface of a CRT, an LCD or the like to effect an input comprising: a tablet composed of a first set of wider parallel electrode wires spaced apart from one another with narrow gaps therebetween and arranged close to the display surface and a second set of narrower parallel electrode wires arranged at an intersecting angle with and in front of the first set so that the wider electrode wires are closer to the display surface than the narrower electrode wires; a control section for sequentially applying pulse signals to said electrode wires of said tablet; coordinate indication means electrostatic-capacity coupled to the pulse signals applied to said electrode wires of said tablet to effect signal detection; calculation means for calculating a positional coordinate from the pulse signals detected by said coordinate indication means; and noise preventive means for relieving a noise from the display surface, the noise preventive means comprising a plurality of resistors each equivalently grounded to one end of one of said wider parallel electrode wires of said tablet; whereby the wider parallel electrode wires that are not applied with the pulse signals act as a shield to reduce the effects of noise emanating from the display surface on the coordinate indication means.

2. A transparent coordinate input apparatus according to claim 1, wherein the resistance of each resistor is hundreds of ohms.

3. A transparent coordinate input apparatus mountable on a display surface of a CRT, and LCD or the like, comprising; a tablet including a set of first electrodes disposed in spaced-apart relations, and a set of second electrodes disposed in spaced-apart relations, the first electrodes being disposed in intersecting relation with the second electrodes and being closer to the display surface than the second electrodes and having a width effective to shield the tablet from electromagnetic noise emanating from the display surface; control means for sequentially applying pulse signals to the first and second electrodes; coordinate indication means for detecting the pulse signals applied to the first and second electrodes to determine therefrom a positional coordinate; and noise preventing means for preventing electromagnetic noise emanating from the display surface from adversely affecting the coordinate indication means, the noise preventing means comprising resistance means connected to the first electrodes for effectively grounding currents induced by the electromagnetic noise in those of the first electrodes to which a pulse signal is not being applied thereby effectively shielding the tablet from noise.

4. An apparatus according to claim 3, wherein the resistance means comprises a resistor having a resistance of at least one hundred ohms connected to each first electrode.

5. An apparatus according to claim 3, wherein the coordinate indication means includes means for detecting the pulse signals applied to the first and second electrodes by electrostatic induction.

6. An apparatus according to claim 3, wherein the first electrodes are parallel to each other, and the second electrodes are parallel to each other and perpendicular to the first electrodes.

* * * * *